(12) United States Patent
Pandey et al.

(10) Patent No.: US 8,756,180 B2
(45) Date of Patent: Jun. 17, 2014

(54) METHOD AND SYSTEM FOR MANAGING PLANT OPERATION

(75) Inventors: Achalesh Kumar Pandey, Greenville, SC (US); Awadesh Kumar Tiwari, Bangalore (IN); Scott Mordin Hoyte, Greenville, SC (US); Mahesh Kumar Asati, Bangalore (IN)

(73) Assignee: General Electric Company, Schenectady, NY (US)

( * ) Notice: Subject to any disclaimer, the term of this patent is extended or adjusted under 35 U.S.C. 154(b) by 236 days.

(21) Appl. No.: 13/305,387

(22) Filed: Nov. 28, 2011

(65) Prior Publication Data

US 2013/0138937 A1 May 30, 2013

(51) Int. Cl.
*G06F 15/18* (2006.01)
*F01K 13/02* (2006.01)

(52) U.S. Cl.
CPC ............ *G06N 99/0085* (2013.01); *F01K 13/02* (2013.01); *F01K 23/0101* (2013.01)
USPC ........................................................ 706/14

(58) Field of Classification Search
CPC ...... G06N 99/005; F01K 13/02; F01K 23/101
USPC .................................................. 706/14, 60
See application file for complete search history.

(56) References Cited

U.S. PATENT DOCUMENTS

| | | | |
|---|---|---|---|
| 6,321,216 B1* | 11/2001 | Otte et al. | 706/14 |
| 7,206,644 B2* | 4/2007 | Iino et al. | 706/14 |
| 2006/0282425 A1* | 12/2006 | Aggarwal et al. | 707/5 |
| 2009/0012653 A1* | 1/2009 | Cheng et al. | 700/287 |

OTHER PUBLICATIONS

Bertini, I. et al. "Start-up optimisation of a combined cycle power plant with multiobjective evolutionary algorithms." Applications of Evolutionary Computation. Lecture Notes in Computer Science vol. 6025, Springer Berlin Heidelberg, Apr. 2010. pp. 151-160. DOI: 10.1007/978-3-642-12242-2_16.*

Podofillini, L. et al. "Dynamic safety assessment: Scenario identification via a possibilistic clustering approach", Reliability Engineering & System Safety, vol. 95, Issue 5, pp. 534-549. Published online Jan. 13, 2010. DOI: 10.1016/j.ress.2010.01.004.*

Jiamthapthaksin, R. et al. "A Framework for Multi-objective Clustering and its Application to Co-location Mining." Advanced Data Mining and Applications. Springer Berlin Heidelberg, 2009. pp. 188-199. DOI: 10.1007/978-3-642-03348-3_20.*

Dumedah, G. et al. "Selecting model parameter sets from a trade-off surface generated from the non-dominated sorting genetic algorithm-II." Water resources management, vol. 24 No. 15. Published online: May 25, 2010. pp. 4469-4489. DOI: 10.1007/s11269-010-9668-y.*

(Continued)

*Primary Examiner* — Jeffrey A Gaffin
*Assistant Examiner* — Benjamin Buss
(74) *Attorney, Agent, or Firm* — Ernst G. Cusick; Frank A. Landgraff

(57) ABSTRACT

Disclosed herein are methods and systems for advising and operating a power plant and related devices. In an embodiment, a power plant operator via a client 135 requests from a server 115 advisory information regarding a current power plant startup. The client 135 may receive custom advisory information based on data of an initial state of the power plant and data from past power plant startups.

20 Claims, 11 Drawing Sheets

(56) References Cited

OTHER PUBLICATIONS

Kirschen, D. et al. "Guiding a power system restoration with an expert system." IEEE Transactions on Power Systems, vol. 6. No. 2, 1991. pp. 558-566. DOI: 10.1109/59.76698.*

Matsumoto, H. et al. "An expert system for startup optimization of combined cycle power plants under NOx emission regulation and machine life management." IEEE Transactions on Energy Conversion, vol. 11, No. 2, 1996. pp. 414-422. DOI: 10.1109/60.507654.*

Bertini, et al., "Soft computing based optimization of combined cycled power plant start-up operation with fitness approximation methods", Applied Soft Computing, Sep. 2011, 11(6), 4110-4116.

Real Time Power: Commander Product Brochure, www.realtimepower.net, Content Copyright 2009-2012, 2 pages.

Tica, et al., "Optimization of the Combined Cycle Power Plant Start-up", Presented at 54th ISA POWID Symposium, Charlotte, North Carolina, Jun. 5-10, 2011, www.isa.org, 9 pages.

* cited by examiner

| Plant Operation | Target Time_Cum | Actual Time_Cum | Target Time_Activity | Actual Time_Activity | Activity Start | Activity End | Advisory |
|---|---|---|---|---|---|---|---|
| Lead GT Start | 0 | 0 | 0 | 0 | 9:00 AM | 9:00 AM | Complete |
| FG startup heater in service & Gas Fuel Temp>150F | 25 | 20 | 15 | 16 | | | Complete |
| Synch lead GT | 30 | 35 | 2 | 7 | | | Complete |
| Vacuum system & pump in service | 40 | 48 | 10 | 13 | | | Complete |
| Open HP Bypass | 45 | 53 | 2 | 2 | | | Complete |
| Gland steam system in service | 55 | 59 | | | | | Complete |
| Lag GT Start | 60 | 60 | | | | | Complete |
| Lag GT Synch | 88 | 83 | | | | | Complete |
| Close HRH sky vent & open HRH bypass valve | 105 | | | | | | Pending |
| HRH Bypass in Auto | 110 | | | | | | Pending |
| Place LP steam to condenser | 115 | | | | | | Pending |
| Open Lag HRSG CRH FCV to 50% | 120 | | | | | | Pending |
| Close IP sky vent & connect IPSH steam to CRH | 120 | | | | | | Pending |
| Place Hotwell heating valve in Auto | 125 | | | | | | Pending |
| ST BOP start permissive | 130 | | | | | | Pending |
| Apply seal steam | 135 | | | | | | Pending |
| ST Temperature matching ON | 140 | | | | | | Pending |
| Latch steam turbine | 145 | | | | | | Pending |
| Roll steam turbine | 150 | | | | | | Pending |
| Hold ST@ 3000 rpm | 160 | | | | | | Pending |
| Synch ST | 170 | | | | | | Pending |
| ST Forward flow | 185 | | | | | | Pending |
| HP Bypass close | 195 | | | | | | Pending |
| Admission steam in service | 200 | | | | | | Pending |
| Temperature matching off | 205 | | | | | | Pending |
| NH3 injection in service | 210 | | | | | | Pending |
| IPC In | 215 | | | | | | Pending |
| Increase HRH bypass set point | 220 | | | | | | Pending |
| Plant base load | 230 | | | | | | Pending |

Figure 8

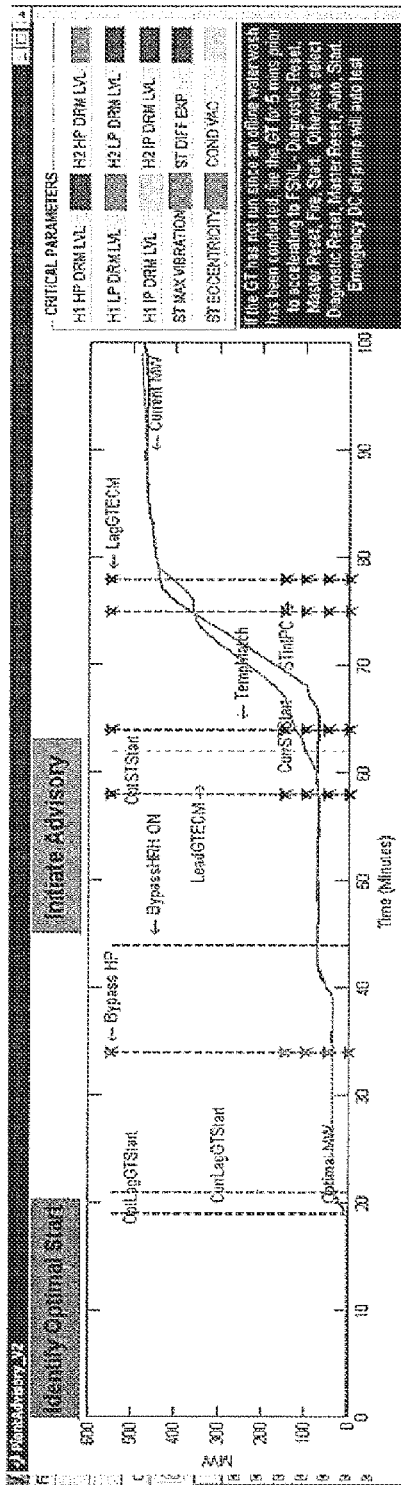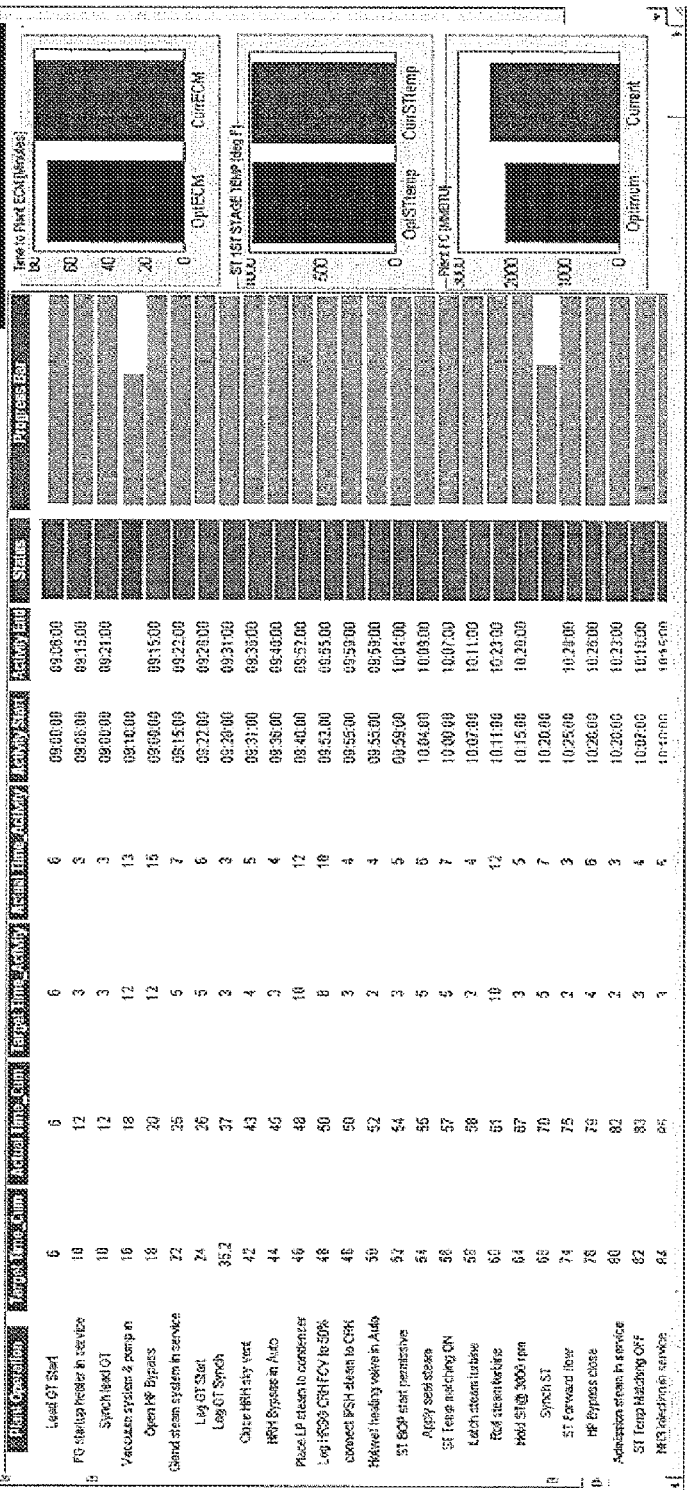
Figure 9

METHOD AND SYSTEM FOR MANAGING PLANT OPERATION

TECHNICAL FIELD

The technical field generally relates to power plants and more specifically relates to power plant operation.

BACKGROUND

Power plants (which also may be referred to as generating stations, power stations, or powerhouses) may use one or more generators to convert mechanical energy into electrical energy. Power plant generators and accompanying power plant devices (e.g., heat recovery steam generators (HRSG), gas and steam turbines, and condensers, etc.) may undergo shutdowns and startups as a result of fluctuations in power demand, proactive and reactive maintenance, and the like. The length of a shutdown along with other variables associated with generators, for example, ambient air temperature, steam turbine bowl metal temperature, type of steam generator, HRSG drum pressure, and the like may determine in what way one or more generators may be started in a safe and efficient manner.

It is desirable for operators to know the electrical and mechanical systems in the facility so the operator can reliably run the system. A challenge for power plant operators is to startup one or more generators in an efficient manner. An efficient start-up may take into account many different factors such as time, fuel consumption, megawatt power generation, stress on equipment, and the like. A power plant operator may need many years of experience in order to consistently determine how to maximize a selected efficiency level when manipulating power plant devices. A power plant operator may transition away from a plant (e.g., retire) and the experience of the plant operator may be lost. Methods and systems discussed herein may assist plant operators in more efficiently and reliably operating a power plant.

BRIEF DESCRIPTION OF THE INVENTION

Disclosed herein are methods and systems for operating a power plant and related devices. In an embodiment, a power plant operator may request advisory information regarding a current power plant startup and receive custom advisory information based on an initial state of the power plant and past power plant startups.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 8 is an exemplary graphical advisory output of a current real-time state and a selected optimal start;

FIG. 9 is an exemplary graphical advisory output of a current real-time state and a selected optimal start;

DETAILED DESCRIPTION OF THE INVENTION

Figure 1:
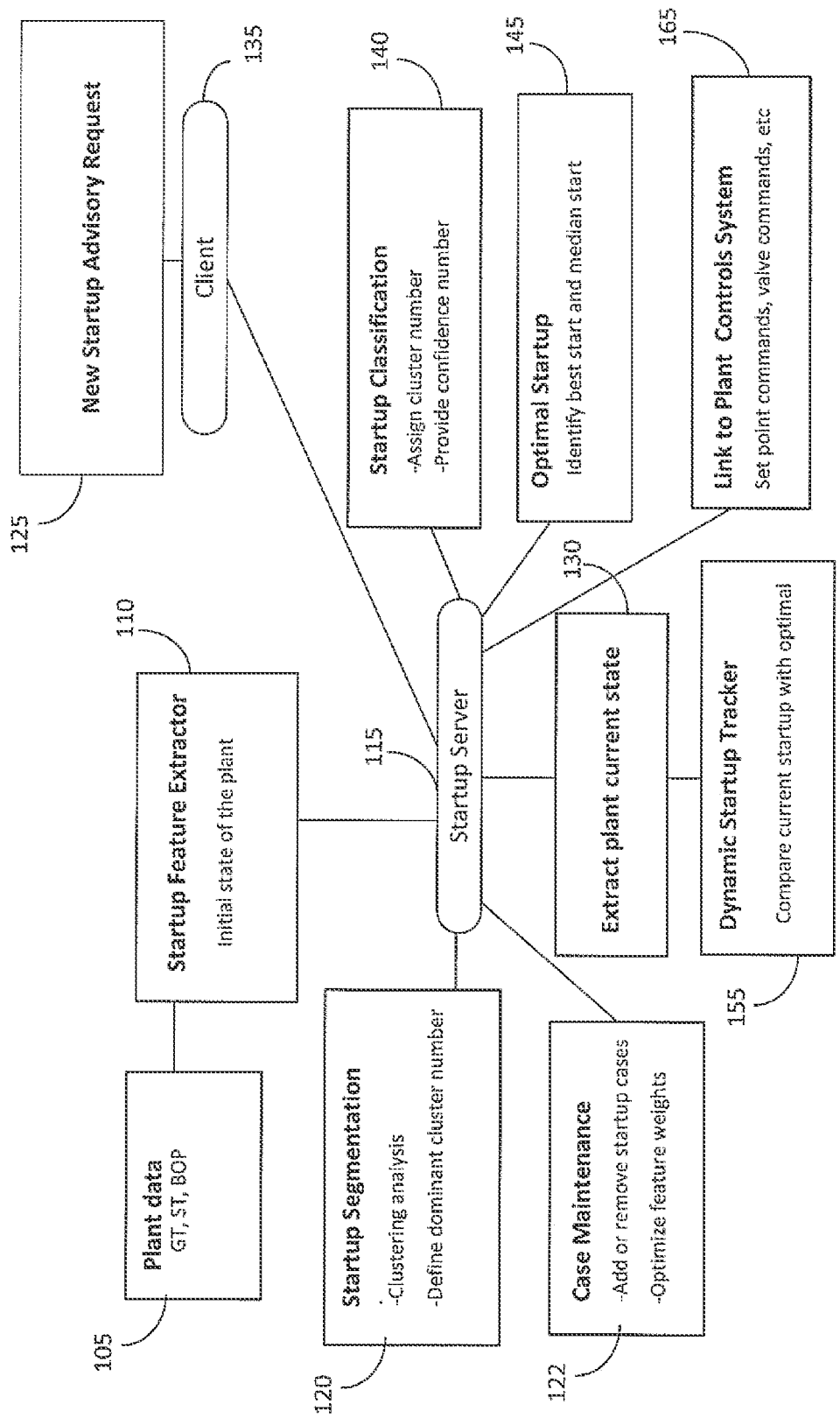
FIG. 1 is an exemplary block diagram of elements of a power plant startup system.

FIG. 1 displays a box diagram of a power plant startup system. Herein, startup may be defined as when a plant reaches a base load operation or may be defined by an operator based on selected events (e.g., a time frame, power output, and the like). At plant data block 105, there may be descriptive data regarding the different plant devices such as a gas turbine, steam turbine, HRSG, balance of plant (BOP), attachments, and the like.

At block 110, data may be automatically compiled regarding the startup state of the plant. The data may comprise the temperature at different sections (e.g., steam inlet temperature or metal bowl temperature), generator idle time, flow, startup time, heat recovery steam generator (HRSG) steam drum pressure, and the like. At block 110, the startup type may also indicate general parameters of hot, warm, and cold based on defined metal temperature ranges or shutdown duration. At block 110, there may be a startup type parameter of 2×1, 1×1, 1×0, etc. For example, 2×1 may mean a startup with two gas turbines and one steam turbine. Startup type 1×0 may mean a startup with only one gas turbine. All the data points gathered at block 110 and 105 may be routed to startup server 115 and ultimately saved in a startup database (not shown).

Startup segmentation at block 120 may comprise instructions for clustering analysis based upon the initial state of the plant or all features. The segmentation may also be defined by heuristics or engineering knowledge, among other things. Startup segmentation at block 120 may be done while power plant devices are online or offline and at regular or irregular intervals.

Case maintenance at block 122 may add or remove startup cases based on criteria defined by an operator. Case maintenance at block 122 may optimize feature weights and model parameters for a classification algorithm (e.g., k value in k-nearest neighbor algorithm (k-NN)). Case maintenance may also comprise optimal model parameters (e.g., number of clusters) which may relate to the clustering analysis of the startup segmentation at block 120. Case maintenance 122 may remove the least relevant startups (while keeping the most relevant startups) in order to maintain responsive processing and classification accuracy, because maintaining data of too many startups may slowdown processing and also may reduce classification accuracy. The maintenance algorithm may be done online or offline and at regular or irregular intervals.

A new startup advisory request at block 125 may be done via a client device 135 and be communicated to the startup server 115. The client device 135 may be connected to the startup server 115 via the internet, a local area network, or may be housed in the same device. The client device 125 may have a user interface similar to a web browser or another customized interface. The new startup advisory request at block 125 may indicate the beginning of an advisory session for an optimal startup of the plant. Here a plant operator may request guidance regarding how to optimally startup a power generator and accompanying power plant devices. At block 125, data automatically compiled at 110 and 105 may be used for the startup session. In an embodiment, any automatically compiled data may be overridden by the operator. In an embodiment, at block 125, startup optimization criteria and a dispatch profile may be entered. The startup optimization criteria may comprise multiple criteria such as startup time, startup cost, fuel consumption, and plant life, among other things. An operator may initiate a request using a power generation load dispatch profile in order to start the plant in a preferred fashion. An optimization method may be empirical or physics based and may also be included in the request at block 125. Unless otherwise noted, an empirical method is assumed herein. At block 125, instead of an empirical model, a physics based model tuned to a particular plant may be used. The physics based model may be selected when there is not enough relevant empirical data, for example a new plant. The operator may define the parameters and define the mission and the physics based model, which may be based on thermodynamic equations and modeling, will estimate what may be done to startup the power plant efficiently.

At block 130, as the startup commences the current state of the plant may continually be extracted. Current state data may be ST metal temperature (S1B etc.), HRSG steam drum pressure, non-running hours of a particular generator type, and the like. This current state may happen in real time.

At block 140, a cluster number or segment number may be assigned based upon similar startup profiles housed in a startup database connected to the startup server 115. A confidence number may be assigned in relations to the current startup and the proposed cluster number.

At block 145, the optimal startup block may comprise the identification of the best startup along with the median startups based upon a dominant cluster. In this regards, the cluster may be a fleet comprising multiple sites or a particular power block. The optimal startup may be defined based on fuel consumption, startup time, or other criteria defined by an operator in the new startup advisory request 125.

The dynamic startup tracker block 155 may include a visual comparison of the current startup with optimal historical startup data. For example, the visual comparison may comprise a fleet as well as a subjected power block. An operator may be shown green, yellow, and red indicators that may help the operator change or otherwise address non congruous variables to optimize the current startup. At block 160, there may be a decision support element which provides startup advisory. Decision support at 160 may guide the plant personnel to adjust the plant to meet optimal startup objectives.

At block 165, there may be a link to a plant control system. The link at block 165 may be connected to the startup server or in another embodiment connected to a client computer. The link may provide an interface for controls to different set point commands and valve open and close commands, among other relevant controls to assist in plant startup and continued operation.

Figure 2:
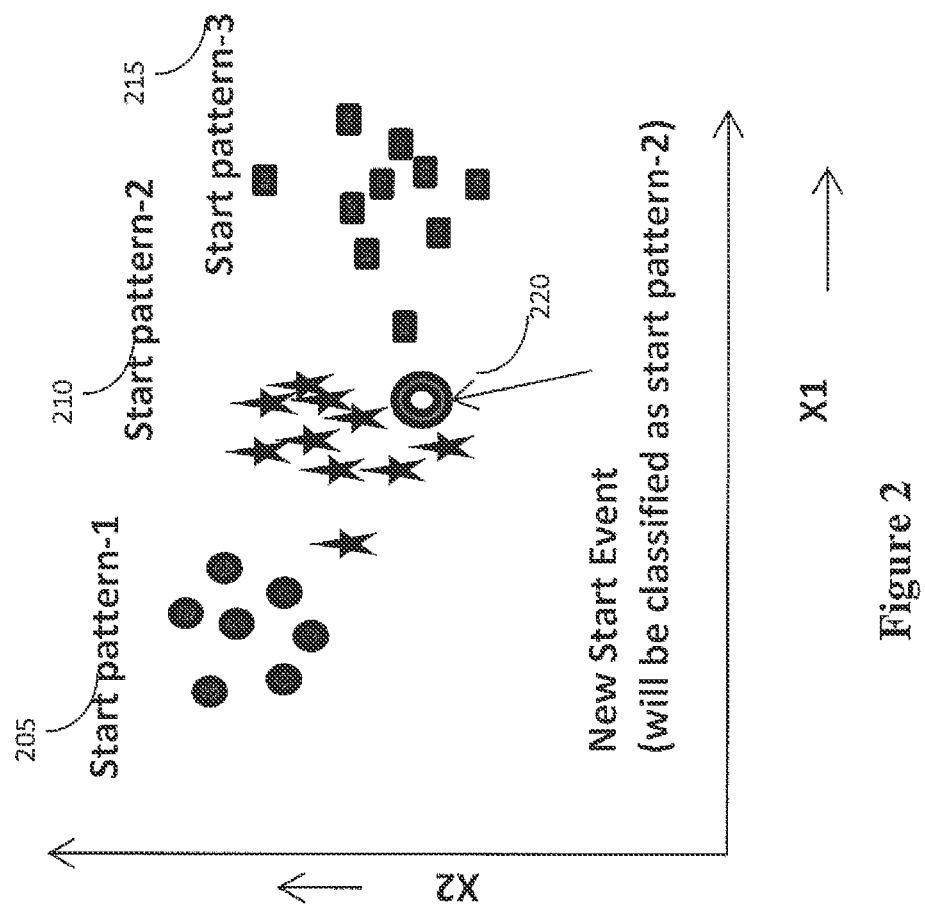
FIG. 2 displays an exemplary graph with three startup clusters.

When a power plant is started the operator may know the initial state of the plant (e.g., current pressure, current temperature at different sections). The state data of the plant may be processed in real-time or near real-time and may be quantified before starting the plant. There may be multiple parameters which define the state of the plant during startup. As introduced in FIG. 1 at block 120 and block 122, startup data may be clustered or grouped in different ways according to a particular pattern. FIG. 2 displays a graph with three exemplary startup patterns. In FIG. 2, start pattern 1 is displayed with circles, start pattern 2 is displayed with stars, and start pattern 3 is displayed with rectangles. The geometric shapes shown in FIG. 2 represent past individual startups. For example, an operator may startup the plant and may request advice based on the current conditions (e.g., New Startup Advisory Request at block 125 and described herein). The current state of the plant may be mapped to one of the appropriate patterns, based on the initial state of the plant. As stated herein, historical startup data may be segmented using a classification technique so that historical startup data may be appropriately applied. In FIG. 2, startup point 220 shows the quantified current state of the associated power plant devices. The startup data may incorporate information that relates not only to a power generator, but also to associated power plant devices. Based on the quantified current state 220, the current state 220 may be grouped with start pattern-2 at 210.

Figure 3:
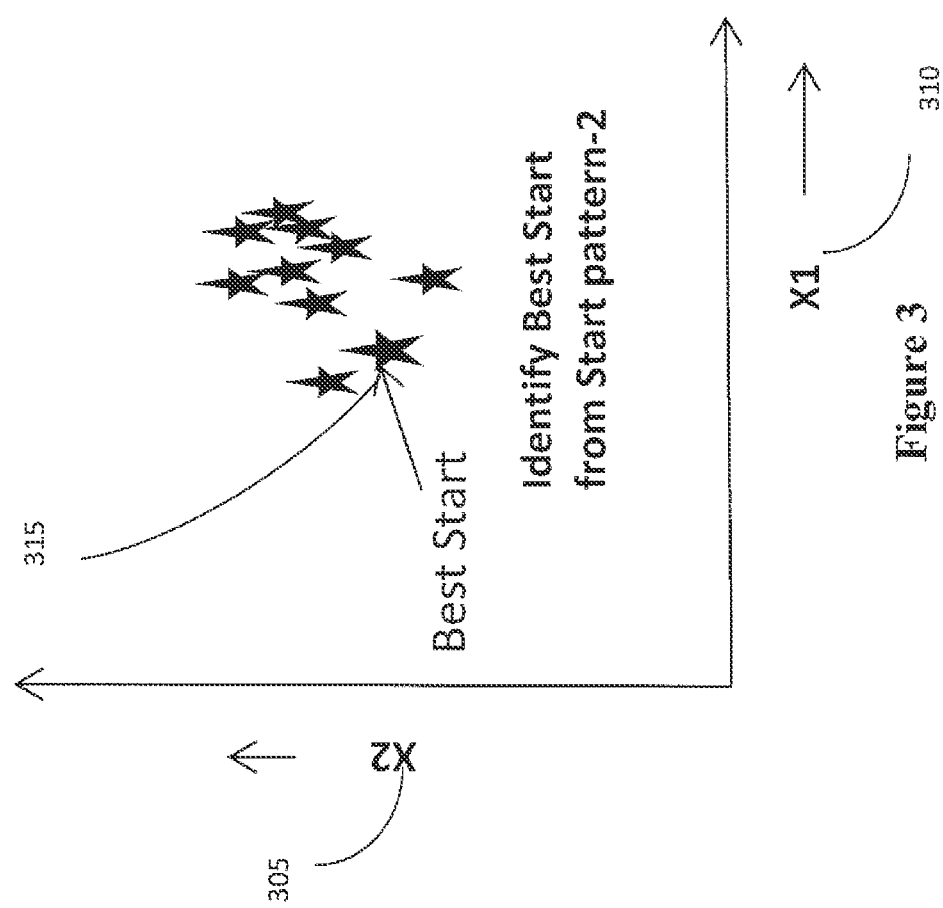
FIG. 3 displays an exemplary graph with a startup cluster.

As stated herein, corresponding to startup 220 there may be a quantification of different variables that relate to the power plant, such as fuel consumption, megawatt power generation, length of time for a startup, and similar metrics. In FIG. 3, which may correspond with FIG. 2, axis X2 305 may be startup time (e.g., in minutes) and axis X1 310 may be a desired fuel consumption based unit (e.g., in gallons), or other metric (e.g., desired emission based unit–g/km). Alternatively, an operator may be less concerned with fuel consumption and other fuel related costs. The aforementioned operator may be more concerned about the life of the equipment and select variables that correlate with the life of the equipment for the X1 310 axis. The operator may decide to maximize equipment life because equipment replacement and maintenance may be the operator's primary cost.

Figure 4:
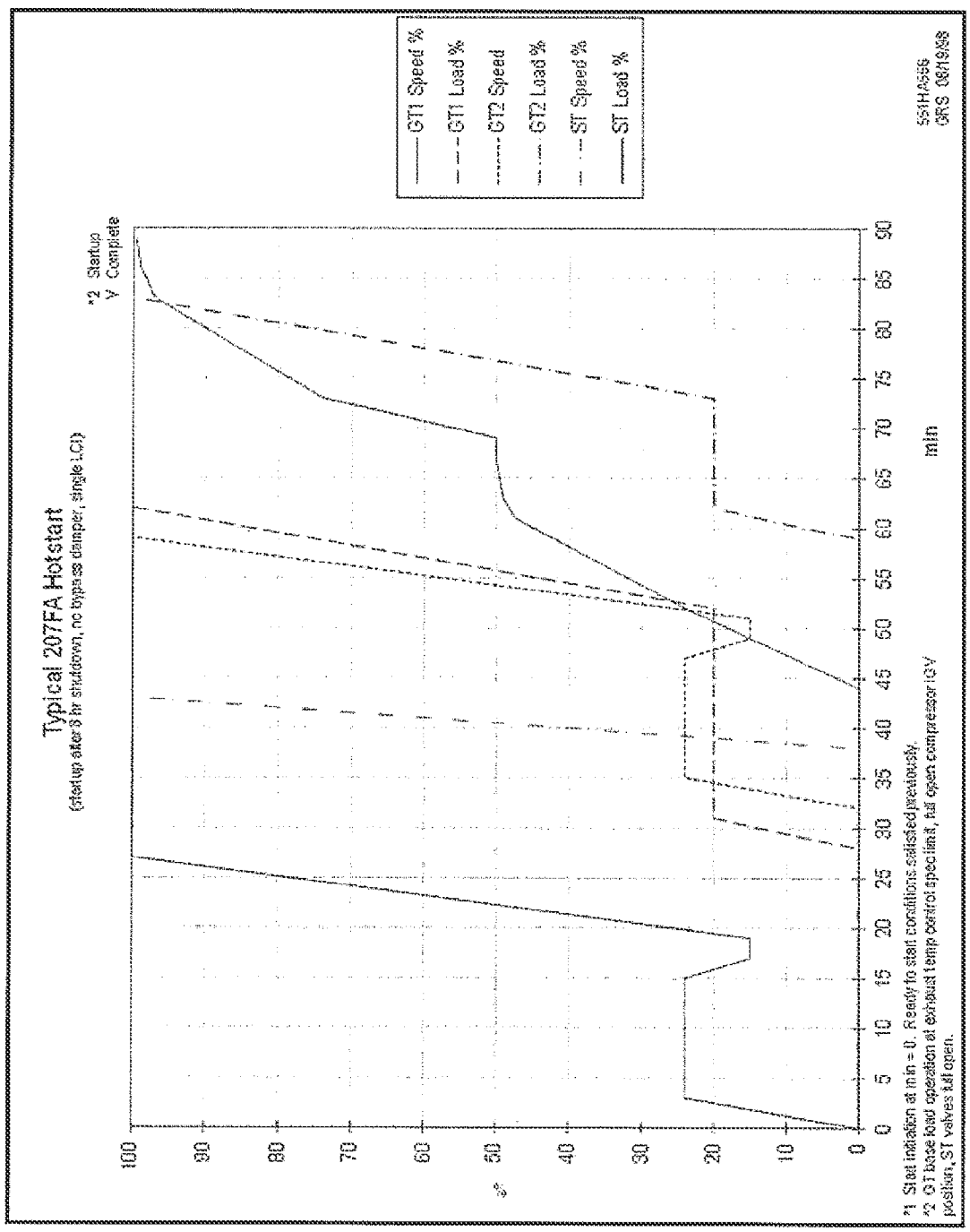
FIG. 4 is an exemplary graph with a 2×1 startup profile.

In FIG. 3, it may be determined that point 315 is the optimal historical startup for the selected parameters. An optimal search may be based upon multi-objective optimization (e.g. Pareto Frontier etc.) methodology or a simple sorting algorithm based upon user inputs. The operator may request all of the information associated with the historical startup 315 to advise the operator. The historical startup 315 may comprise data gathered at a time when a retired operator, the current operator at a different time, or some other operator was in operation of the plant. Once the best startup 315 is retrieved, the operator may receive guidance on how to control the plant systems in correspondence to the optimal startup 315. FIG. 4 is an exemplary graphical output of 2×1 startup load and speed profile.

Although FIGS. 2 and 3 show an X1 and an X2 axis for a total of two parameters, there may be multiple parameters selected based on operator preference and therefore multiple dimensions, as well. For example, there may be a three-dimensional graphical output, wherein an x-axis may be based on startup time, a y-axis may be based on fuel consumption, and a z-axis may be startup emission. As stated herein in other examples, quantified startups may be grouped and appropriately applied to a power plant startup.

Figure 5:
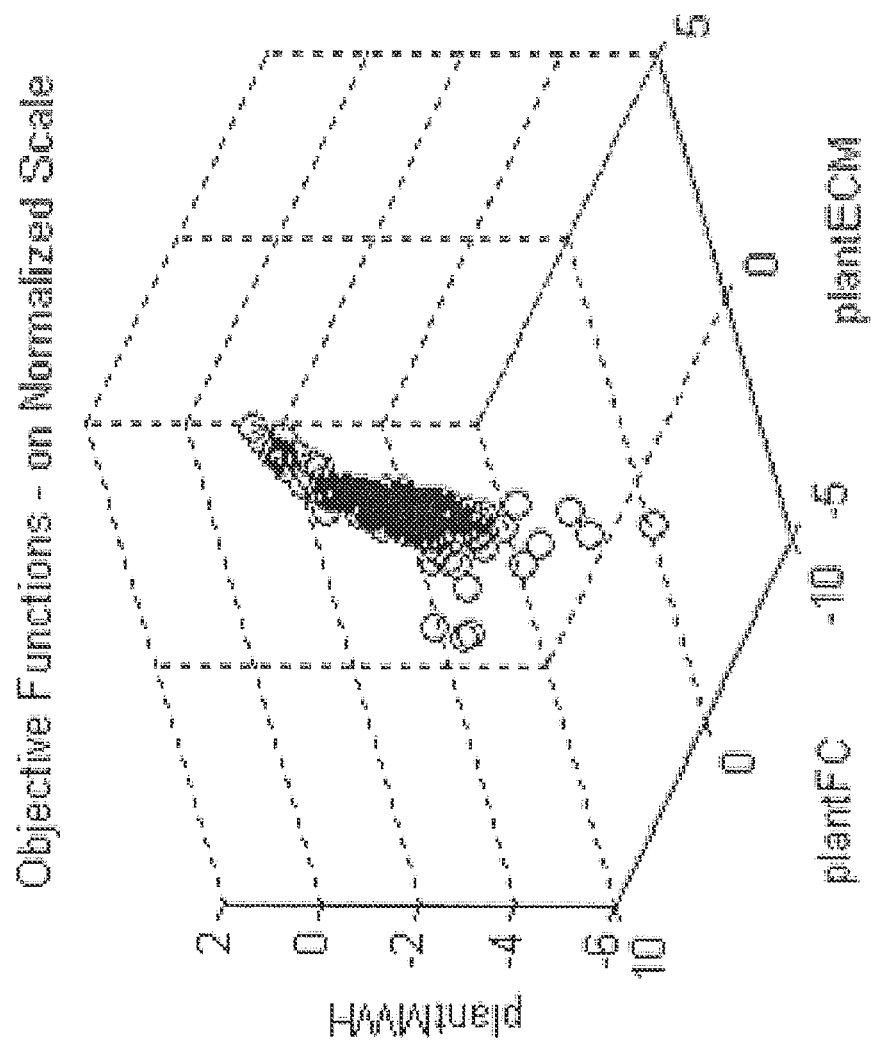
FIG. 5 is an exemplary three-dimensional plot displaying startup time to reach emission compliance mode (ECM), startup fuel consumption (FC), and startup plant megawatt hour (MWH) generation.
Figure 6:
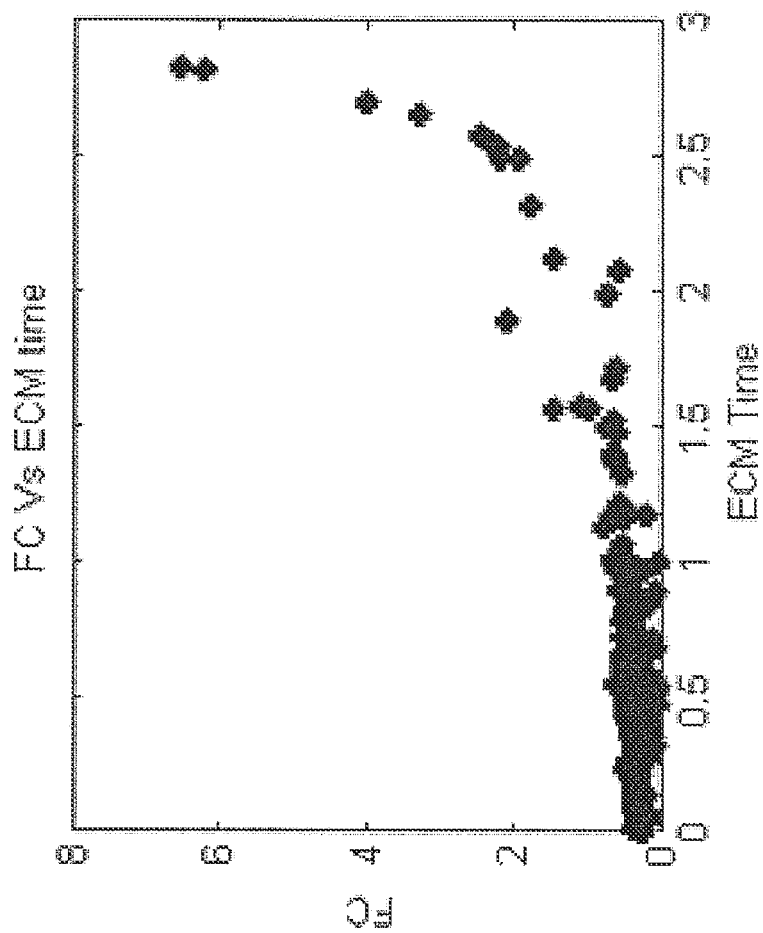
FIG. 6 is an exemplary graph showing startup time and startup fuel consumption.
Figure 7:
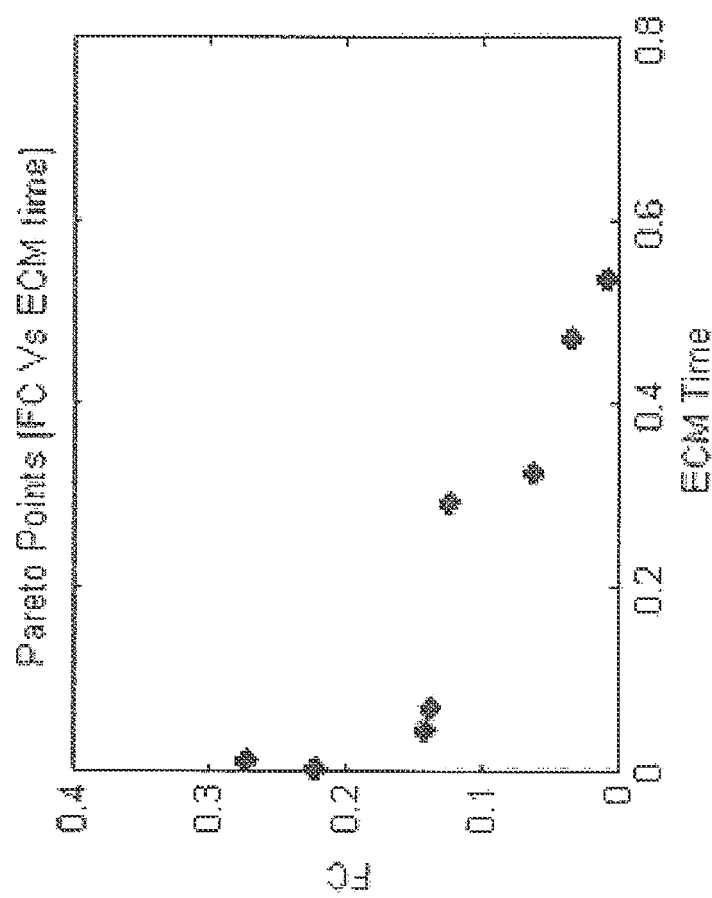
FIG. 7 is an exemplary Pareto frontier after running optimizer.

FIG. 5 is an exemplary three-dimensional plot displaying startup time to reach emission compliance mode (ECM), startup fuel consumption (FC), and startup plant megawatt hour (MWH) generation. FIG. 6 is an exemplary chart showing startup time and startup fuel consumption. FIG. 7 is an exemplary pareto frontier, wherein the dots are optimal startup instances.

FIG. 8 is an exemplary graphical advisory output of a current real-time state compared to a selected optimal start. The different fields may be color coded to indicate ranges of positive and/or negative feedback. For example, a red indicator may indicate extremely negative feedback, a yellow indicator may indicate modest negative feedback, and a green indicator may indicate positive feedback (i.e., very close or identical to the selected optimal start). There are several operations that can be tracked based on several different parameters. For example, in FIG. 8 the operations are tracked based on time. FIG. 9 is another exemplary graphical advisory output of a current real-time state compared to a selected optimal start.

Figure 10:
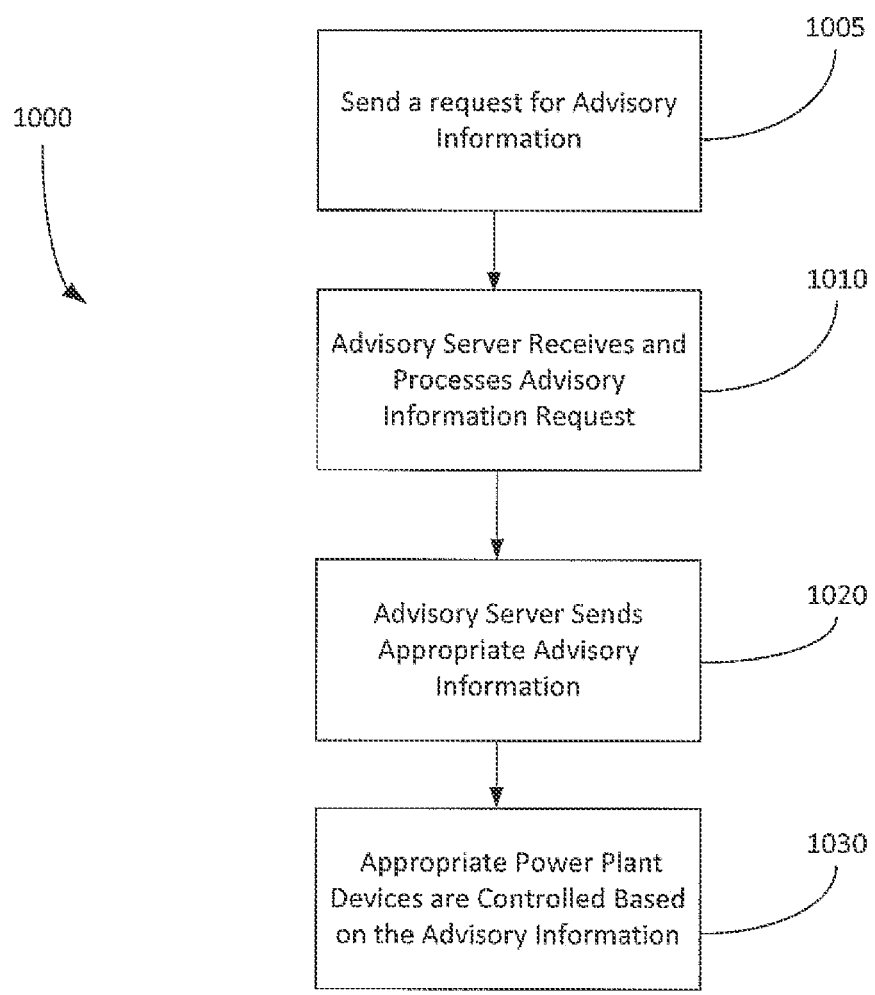
FIG. 10 illustrates an exemplary method of implementing a power plant advisory system.

FIG. 10 illustrates a non-limiting, exemplary method of implementing a power plant advisory system. Method 1000 can be performed by computing equipment including mobile devices (e.g., tablet computers), servers, or any other device that can execute computing functions.

In an embodiment at block 1005, a request for advisory information is sent. The request 1005 may be done automatically upon a condition (e.g., plant startup) or at the request of an operator. The request may contain information that is automatically obtained via computers and/or information that is entered in by an operator. As stated herein, the multiple optimization criteria may be selected and sent with the advisory information request.

At block 1010, the advisory information request is received and processed by a server. At block 1020, the server sends appropriate advisory information back to the requestor. At block 1030, an appropriate power plant device is controlled based on the advisory information.

In one embodiment of method 1000, at block 1030 the advisory information may be a list or other graphical representation of past power plant startup instances. The list may be restricted based on segmentation done by the server. The segmentation may be based on the startup conditions of the power plant devices and further segmented based on user preferences, engineering knowledge, and/or heuristics. Because there may be hundreds or thousands of startups that may fit a particular startup condition (e.g., when using fleet data), cluster analysis may be used to segment or group similar startups together based upon a state of the plant. Every startup may be labeled with a cluster number. When a new startup request is initiated, a classification algorithm may map the new start to a dominant cluster. A list from the dominant cluster may comprise information regarding the best startup (e.g., least time, fuel consumption, and emission etc.), the median startup, and other similar statistics.

The past startup instances in the dominant cluster may be ranked based just on the dominant cluster, on all past power plant startups, and the like. For example, a power plant startup instance may rank number 1 for time in the dominant cluster, but rank number 33 in time in relation to all power plant startup instances. An operator may choose a desired past power plant startup instance from the defined dominant cluster and then control the power plant devices based on the chosen past power plant startup. In an embodiment, the advisory information may comprise alarms and anomalies associated with a historical optimal start. This information may be used to understand potential faults or anomalies even before starting the plant. This may help avoid those issues during startup. For example, during a real time startup, an alarm may be provided, if an anomaly is detected during startup.

The methods and systems described herein may apply to a single power generator and accompanying plant devices in a single power plant, multiple power generators and accompanying plant devices in a single power plant, or multiple power generators and accompanying plant devices in multiple power plants (e.g., fleet). For example, there may be several virtually identical power plants in the same region (e.g. southeast). All sites in the region (or possibly across the country) may incorporate historical data and create advisory information for a particular plant. Again, for example, there is an option to get the optimal startup based on a fleet or sub-fleet or an optimal startup for a single plant or power block. Although the disclosure discusses startups, the methods and systems discussed herein may apply to startups, shutdowns, as well as defined conditions before, after, and in between startup and shutdown.

Without in any way limiting the scope, interpretation, or application of the claims appearing herein, a technical effect of one or more of the example embodiments disclosed herein is to provide adjustments to power plant devices. Another technical effect of one or more of the embodiments disclosed herein is that an optimal power plant startup solution is provided.

Figure 11:
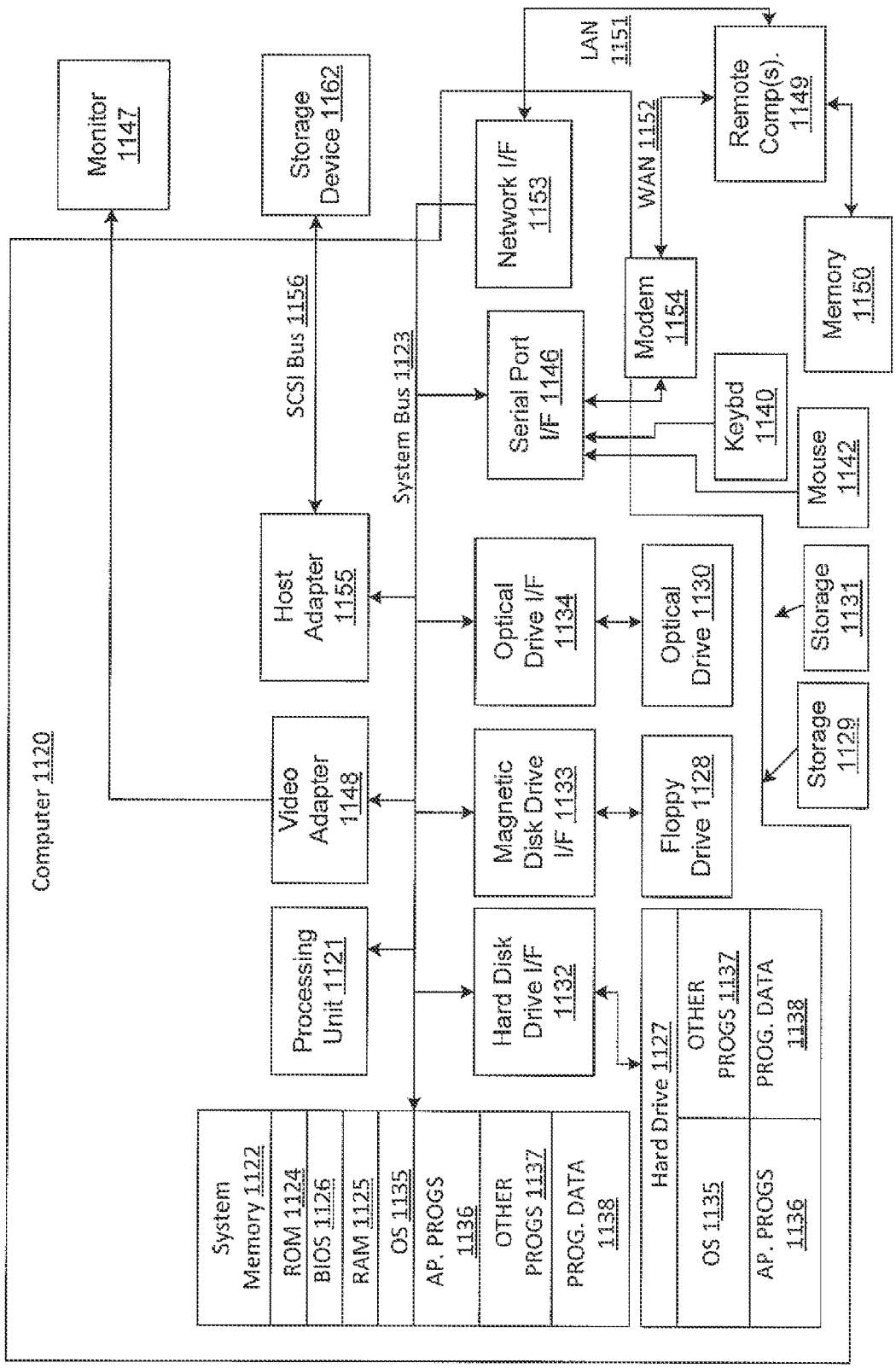
FIG. 11 is an exemplary block diagram representing a general purpose computer system in which aspects of the present invention thereof may be incorporated.

FIG. 11 and the following discussion are intended to provide a brief general description of a suitable computing environment in which the present invention and/or portions thereof may be implemented. Although not required, the invention may be described in the general context of computer-executable instructions, such as program modules, being executed by a computer, such as a client workstation, server or personal computer. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

FIG. 11 is a block diagram representing a general purpose computer system in which aspects of the present invention and/or portions thereof may be incorporated. As shown, the exemplary general purpose computing system includes a computer 1120 or the like, including a processing unit 1121, a system memory 1122, and a system bus 1123 that couples various system components including the system memory to the processing unit 1121. The system bus 1123 may be any of several types of bus structures including a memory bus or memory controller, a peripheral bus, and a local bus using any of a variety of bus architectures. The system memory includes read-only memory (ROM) 1124 and random access memory (RAM) 1125. A basic input/output system 1126 (BIOS), containing the basic routines that help to transfer information between elements within the computer 1120, such as during start-up, is stored in ROM 1124.

The computer 1120 may further include a hard disk drive 1127 for reading from and writing to a hard disk (not shown), a magnetic disk drive 1128 for reading from or writing to a removable magnetic disk 1129, and an optical disk drive 1130 for reading from or writing to a removable optical disk 1131 such as a CD-ROM or other optical media. The hard disk drive 1127, magnetic disk drive 1128, and optical disk drive 1130 are connected to the system bus 1123 by a hard disk drive interface 1132, a magnetic disk drive interface 1133, and an optical drive interface 1134, respectively. The drives and their associated computer-readable media provide nonvolatile storage of computer readable instructions, data structures, program modules and other data for the computer 1120.

Although the exemplary environment described herein employs a hard disk, a removable magnetic disk 1129, and a removable optical disk 1131, it should be appreciated that other types of computer readable media which can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, magnetic disk 1129, optical disk 1131, ROM 1124 or RAM 1125, including an operating system 1135, one or more application programs 1136, other program modules 1137 and program data 1138. A user may enter commands and information into the computer 1120 through input devices such as a keyboard 1140 and pointing device 1142. Other input devices (not shown) may include a microphone, joystick, game pad, satellite disk, scanner, or the like. These and other input devices are often connected to the processing unit 1121 through a serial port interface 1146 that is coupled to the system bus, but may be connected by other interfaces, such as a parallel port, game port, or universal serial bus (USB). A monitor 1147 or other type of display device is also connected to the system bus 1123 via an interface, such as a video adapter 1148. In addition to the monitor 1147, a computer may include other peripheral output devices (not shown), such as speakers and printers. The exemplary system of FIG. 11 also includes a host adapter 1155, a Small Computer System Interface (SCSI) bus 1156, and an external storage device 1162 connected to the SCSI bus 1156.

The computer 1120 may operate in a networked environment using logical connections to one or more remote computers, such as a remote computer 1149. The remote computer 1149 may be a personal computer, a server, a router, a network PC, a peer device or other common network node, and may include many or all of the elements described above relative to the computer 1120, although only a memory storage device 1150 has been illustrated in FIG. 11. The logical connections depicted in FIG. 11 include a local area network (LAN) 1151 and a wide area network (WAN) 1152. Such networking environments are commonplace in offices, enterprise-wide computer networks, intranets, and the Internet.

When used in a LAN networking environment, the computer 1120 is connected to the LAN 1151 through a network interface or adapter 1153. When used in a WAN networking environment, the computer 1120 may include a modem 1154 or other means for establishing communications over the wide area network 1152, such as the Internet. The modem 1154, which may be internal or external, is connected to the system bus 1123 via the serial port interface 1146. In a networked environment, program modules depicted relative to the computer 1120, or portions thereof, may be stored in the remote memory storage device. It will be appreciated that the network connections shown are exemplary and other means of establishing a communications link between the computers may be used.

Computer 1120 may include a variety of computer readable storage media. Computer readable storage media can be any available media that can be accessed by computer 1120 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1120. Combinations of any of the above should also be included within the scope of computer readable media that may be used to store source code for implementing the methods and systems described herein. Any combination of the features or elements disclosed herein may be used in one or more embodiments.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A method comprising:
   sending a request for past power plant startup data;
   receiving data associated with a plurality of past power plant startup instances;
   clustering the data associated with the plurality of past power plant startup instances;
   selecting first data for a first past power plant startup instance corresponding to a dominant cluster in the clustered data associated with the plurality of past power plant startup instances, wherein the first past power plant startup instance includes a startup of at least two turbines; and
   adjusting a second power plant startup instance based on the first data for the first past power plant startup instance, wherein the second power plant startup instance includes at least a startup of a first turbine and a second turbine.

2. The method of claim 1, wherein the data associated with the plurality of past power plant startup instances comprises at least one of a best past power plant startup instance and a median past power plant startup instance.

3. The method of claim 2, wherein at least one of the best past power plant startup instance and the median past power plant startup instance is based on criteria defined by an operator.

4. The method of claim 1, wherein the data associated with the plurality of past power plant startup instances comprises a cluster of comparable power plant startup instances.

5. The method of claim 4, wherein the cluster of comparable power plant startup instances is based upon heuristics or engineering knowledge.

6. A method comprising:
recording empirical data of a first power plant startup;
performing clustering analysis on the empirical data of the first power plant startup and on empirical data of a plurality of past power plant startups;
grouping into a set of clusters the first power plant startup and the plurality of past power plant startups based on the clustering analysis;
in response to receiving an advisory request regarding a current power plant startup, selecting a dominant cluster of instances of power plant startups based on an initial state of a first turbine and a second turbine; and
providing instructions to adjust the current power plant startup based on an instance of the dominant cluster of instances, wherein the current power plant startup comprises the startup of the first turbine and the second turbine.

7. The method of claim 6, wherein the clustering analysis is based upon data from a fleet of power plants.

8. The method of claim 6, wherein the advisory request regarding the current power plant startup comprises data of an initial state of the current power plant startup operation.

9. The method of claim 6, wherein the advisory request regarding the current power plant startup operation comprises data provided by an operator.

10. The method of claim 6, wherein the clustering analysis is based upon a state of the first power plant startup and a state of the plurality of past power plant startups.

11. The method of claim 6, wherein the data based on the dominant cluster comprises at least one of data of a best past power plant startup instance and data of a median past power plant startup instance.

12. The method of claim 6, further comprising:
removing the empirical data of the first power plant startup from the cluster analysis; and
performing the clustering analysis based on the removal of the empirical data of the first power plant startup.

13. The method of claim 12, wherein the removing of the empirical data of the first power plant startup from the cluster analysis is responsive to the empirical data of the first power plant startup being within the limits of optimal model parameters.

14. A system for operating a power plant comprising:
a first processor adapted to execute computer-readable instructions; and
a first memory communicatively coupled to said first processor, said first memory having stored therein computer-readable instructions that, if executed by the first processor, cause the processor to perform operations comprising:
recording empirical data of a first power plant startup;
performing clustering analysis on the empirical data of the first power plant startup and on empirical data of a plurality of past power plant startups;
segmenting an output of the performed clustering analysis into a dominant cluster of instances of power plant startups based on an initial state of a first turbine and a second turbine; and
in response to receiving an advisory request regarding a current power plant startup, providing instructions to adjust the current power plant startup based on an instance of the dominant cluster of instances, wherein the current power plant startup comprises the startup of the first turbine and the second turbine.

15. The system of claim 14, wherein the clustering analysis is based upon data from a fleet of power plants.

16. The system of claim 14, wherein the advisory request regarding the current power plant startup comprises data of an initial state of the current power plant startup operation.

17. The system of claim 14, wherein the clustering analysis is based upon a state of the first power plant startup and a state of the plurality of past power plant startups.

18. The system of claim 14, wherein the first memory further comprises instructions for performing:
removing the empirical data of the first power plant startup from the cluster analysis; and
performing the clustering analysis based on the removal of the empirical data of the first power plant startup.

19. The system of claim 18, wherein the removing of the empirical data of the first power plant startup from the cluster analysis is responsive to the empirical data of the first power plant startup being within the limits of optimal model parameters.

20. The system of claim 14, further comprising:
a second processor adapted to execute computer-readable instructions; and
a second memory communicatively coupled to said second processor, said second memory having stored therein computer-readable instructions that, if executed by the second processor, cause the processor to perform operations comprising:
receiving data based on the dominant cluster, the data based on the dominant cluster comprising data of a plurality of past power plant startups based on the current power plant startup;
selecting a first data for a second power plant startup from among the data of the plurality of past power plant startups based on the current power plant startup; and
adjusting a power plant device based on the selected first data for the second power plant startup.

* * * * *